United States Patent Office

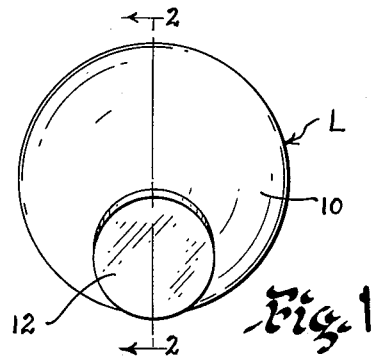
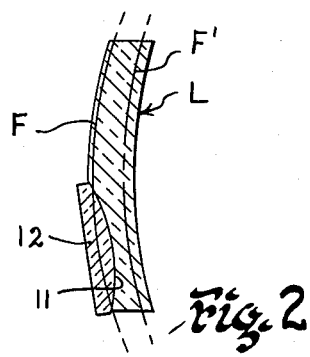
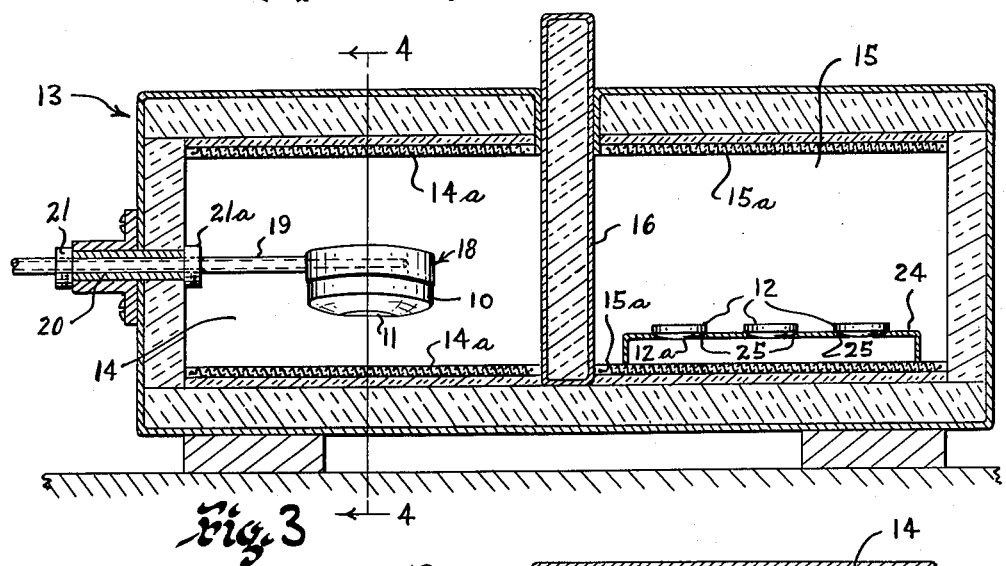
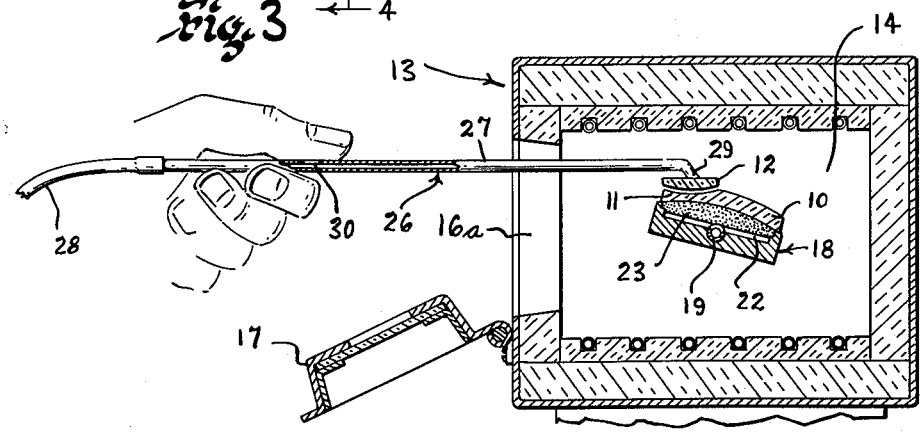
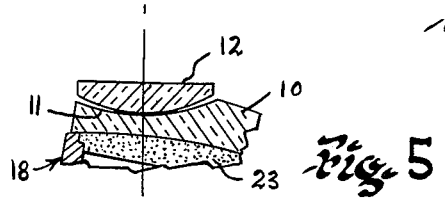
INVENTOR
LEE O. UPTON
BY
ATTORNEY

2,958,162
Patented Nov. 1, 1960

2,958,162

IMPROVED METHOD OF MAKING FUSED GLASS ARTICLES

Lee O. Upton, Sturbridge, Mass., assignor to American Optical Company, Southbridge, Mass., a voluntary association of Massachusetts Filed May 9, 1957, Ser. No. 658,179

1 Claim. (Cl. 49—82.1)

This invention relates to an improved method of treating and heat-joining the surfaces of such articles.

In the art of fusing glass surfaces with each other, particularly in forming fused blanks for multifocal lenses wherein the interfacial characteristics of the joined surfaces of the respective parts thereof must be of a high degree of optical perfection, considerable difficulty has been encountered heretofore in avoiding the occurrence of interfacial defects such as entrapped gaseous bubbles and/or particulate matter between said joined surfaces which consequently render the fused blanks unsuitable for use.

Whether the surfaces of the glass parts are formed by grinding and polishing or by fire-glazing, it has been found that, due to the chemical activity of said glass surfaces, moisture molecules from the surrounding atmosphere and/or gases or other species such as carbon dioxide, ammonia or the like will deposit themselves on the surfaces and, in the case of moisture reaction with the glass, form what has become known as a hydrated silicate surface film, $Si(OH)_4$. This hydrated silicate film results from atmospheric moisture replacement of oxygen atoms which are removed from the glass network-forming structure of the silica tetrahedra during the grinding and polishing operations employed to form the surfaces of said glass parts. The moisture molecules which are attracted to the glass surfaces tend to migrate thereover and orient themselves into positions of lowest equilibrium through their inherent tendency to find that portion of the glass surface which is ionically charged most highly and to which they can adhere most tenaciously. They then chemically combine themselves with the silicon atoms in the glass surface to form the hydrated silicate surface film. This film, during the fusing of the glass surfaces to each other, is decomposed by the heat required for fusing and gives off water vapor which becomes entrapped as undesirable interfacial bubbles between the glass layers. It has also been found that foreign matter such as the collection of particulate organic or inorganic matter in the form of dust if present on the glass surfaces will, during the fusing operation, also give off gases which also may result in the entrapment of interfacial bubbles.

As previously set forth, a large percentage of fused blanks formed by prior art means and methods must, due to the occurrence of interfacial bubbles, be rejected as unsuitable for optical use.

Accordingly, it is a principal object of the present invention to provide, more particularly in the art of fusing glass articles such as optical lens blanks or the like, a novel method of avoiding the occurrence of interfacial defects of the heat-joined surfaces of such glass articles.

Another object is to provide a novel method of fusing preformed optical glass parts wherein the surfaces thereof are conditioned prior to their heat-joining to cause the resultant surfaces to be substantially free from interfacial imperfections such as bubbles, particulate matter or the like which might be detrimental to the optical quality of the lenses to be subsequently formed from said heat-joined parts.

Another object is to provide a novel method of heat-treating the parts of optical glass elements to be subsequently heat-joined in fused relation with each other whereby the surfaces of said parts to be subsequently joined will be substantially free of extraneous matter prior to the fusing thereof and further providing novel means and method of heat-joining said parts to provide a substantially distortionless interfacial fusion therebetween.

Another object is to provide, in the art of fusing pieces of glass to each other, a novel method of performing the steps of dehydrating and oxidizing the surfaces of said pieces of glass to be joined to prevent the formation of interfacial bubbles during fusing, temperature-conditioning each of said pieces to prevent thermal shock or an undesirable glass wetting of one of said pieces by another thereof at the time of their initial contact with each other, maintaining said surfaces substantially free of foreign matter during said dehydration and temperature-conditioning, positioning said surfaces in accurate engaging registry with each other, causing said surfaces to fuse together by subjecting them to precise fusing temperatures and thereafter annealing the composite glass structure thus formed.

Another object is to provide a novel method of the above character for fusing optical lens parts including treating said lens parts by the application of controlled heating to dehydrate and oxidize the surfaces of the parts to be joined so as to substantially rid said surfaces of any existing hydrated silicate film which might be initially present thereon while simultaneously maintaining said surfaces to be joined in a downwardly facing direction during the application of said controlled heating to avoid possible accumulation of particulate matter thereon.

A further object is to provide, in combination with the above, a novel method of assembling and fusing the glass parts of multifocal lens blanks or the like wherein the surface of at least one of said parts will be caused to engage the adjacent surface of the other of said parts and to assume a position at which its center of gravity naturally reaches a minimum level and thereafter, upon being controllably heated to a fusing temperature, gradually assume the shape of its adjoining part by progressively slumping thereagainst in directions extending outwardly from its point of contact towards its outer periphery.

A still further object is to provide an economical method of heat-treating, assembling, and fusing parts of optical glass articles which is accurate and relatively rapid in operation, and which avoids the occurrence of interfacial gaseous bubbles and/or particulate matter between the fused parts of said articles whereby the joinder of the articles thus formed will be substantially optically perfect and not subject to the usual relatively high percentage of rejection common to the trade.

Other objects and advantages of the invention will become apparent from the detailed description which follows when taken in conjunction with the accompanying drawings in which:

Fig. 1 is a plan view of a fused lens blank embodying the invention;

Fig. 2 is a cross-sectional view taken substantially on line 2—2 of Fig. 1 looking in the direction of the arrows;

Fig. 3 is a longitudinal cross-sectional view of a device for fusing lens blanks in accordance with the embodiment of the invention;

Fig. 4 is a cross-sectional view taken substantially on line 4—4 of Fig. 3 looking in the direction of the arrows and further diagrammatically illustrating a means for assembling the parts of the lens blanks to be fused; and Fig. 5 is a fragmentary sectional view of the assembled parts of a lens blank illustrating their relative positions prior to the fusion thereof.

Referring more particularly to the drawings wherein like characters of reference designate like parts throughout the various views thereof, Figs. 1 and 2 illustrate a fused multifocal lens blank L formed in accordance with the invention. Lens blank L comprises a major part 10 preferably formed of an optical crown glass or the like having a ground and polished countersink 11 of controlled curvature to which a disc 12 of flint, barium or other suitable high index optical glass is fused so as to form the minor or segment part of blank L. The glass composition of disc 12 is selected in accordance with the optical characteristics desired of the segment or reading portion of the resultant lens to be formed from said blank L and the curvature of said countersink 11 is controlled in accordance with the index of refraction of disc 12 to produce the desired add in power to the reading or segment portion of the finished lens in accordance with standard practice.

The finishing of lens blank L is accomplished by providing a surface curvature indicated by the dash line F, Fig. 2, upon the segment side of blank L in accordance with standard practice and which constitutes the base curve of the finished lens.

Referring more particularly to Figs. 3 and 4 which illustrate one form of an apparatus used to perform the steps of fusing the parts of lens blank L in accordance with the invention, there is shown a furnace 13 having a pair of adjacent heating chambers 14 and 15 separated by a removable partition 16. Chambers 14 and 15 are heated by means of conventional resistance coils 14a and 15a respectively which are adapted to be connected in the usual manner to a suitable source of electric current which is controlled by any known proper thermo-electric temperature control means so as to produce and maintain the specific temperatures required in each of said chambers 14 and 15, which temperatures will be discussed in detail hereinafter.

Access to chambers 14 and 15 is accomplished through a lateral opening 16a which extends across the front of furnace 13, Fig. 4. A pair of meeting hinged door members 17 are provided to completely enclose opening 16a during certain of the lens blank fusing operations to follow. One of said door members is located in front of each of the chambers 14 and 15 whereby access to a particular one of said chambers may be accomplished by opening only its respective door member while maintaining the part of opening 16a in front of the other of said chambers closed.

In the case of the particular fusing furnace illustrated, chamber 14 is to be used to temperature condition the major part 10 of lens blank L and chamber 15 is used to temperature condition the disc part 12 of blank L prior to their assembly and fusion. To this end, chamber 14 is provided with a disc-like vacuum holder 18 attached to one end of a rotatable tubular supporting shaft 19 which extends outwardly through a side wall of chamber 14. A bearing member 20 and collars 21, 21a are provided to maintain holder 18 in a desired centrally located position within chamber 14. Holder 18 is provided with a recessed interior portion 22, Fig. 4, over which is fitted a permeable lens mounting block 23, preferably formed of a suitable ceramic material or the like, which has its outer surface shaped substantially to the concave curvature of the major part 10 of lens blank L. Tubular shaft 19 is so connected to holder 18 as to have its hollow interior communicating with recess 22 in holder 18 and is connected at its opposite end to any conventional vacuum creating means such as, for example, a pump or the like, not shown. In order to attach a major part 10 of a lens blank L to holder 18, said part 10 is seated upon block 23 with its concave surface in intimate engaging relation therewith and the air in the permeable block 23 and recess 22 is evacuated through shaft 19. By so doing, the part 10 of blank L is drawn securely against block 23 and may be rotated to any position of use such as illustrated in Figs. 3 and 4 without becoming dislodged therefrom or causing a sagging of the countersink portion 11 during the later temperature conditioning cycles.

Chamber 15 is used to temperature condition the disc part 12 of lens blank L prior to the fusing operation to follow and is provided with a rack 24 having openings 25 therein of a diameter slightly less than that of the discs 12 so as to cause said discs to be supported about their periphery when positioned over said openings in the manner illustrated in Fig. 3.

When it is desired to transfer one of the discs 12 from chamber 15 to chamber 14 and place said disc upon the countersink 11 of the major part 10 of blank L, the partition 16 between the chambers is raised, doors 17 are opened and a vacuum pick-up means 26, such as diagrammatically illustrated in Fig. 4, is used. Pick-up means 26 comprises an elongated tubular member 27 having one end connected to a suitable conventional vacuum system by means of a flexible hose or the like 28 and its opposite end shaped to provide a downwardly directed vacuum seat 29. An opening 30 is provided in member 27 over which the thumb or finger of an operator is placed when it is desired to produce a vacuum effect at the seat 29. In operation, the pick-up means 26 functions as follows:

Upon closing opening 30 by placing the thumb thereover, the seat 29 of member 27 is placed in contact with a surface of a disc 12 to cause said disc to be securely held thereagainst by the vacuum created internally of member 27. The disc 12 is then transferred to chamber 14 and positioned, after rotation of holder 18 and blank 10 to an upright position, over the countersink portion 11 of blank L, Fig. 4, whereupon hole 30 is uncovered by removing the operator's thumb. By so doing, the vacuum system is caused to draw air through hole 30 and thus break the vacuum effect at seat 29 to release disc 12.

It is particularly pointed out that the above-described apparatus is given by way of illustration only and that the lens blank fusing operation to follow may be accomplished with other types of fusing furnaces or modified forms of the disclosed apparatus.

It has been found that in conventional lens fusing operations, the occurrence of interfacial bubbles or the like is brought about principally by the decomposition of the above-discussed hydrated silicate surface film, $Si(OH)_4$, which inherently forms upon glass articles exposed to normal atmospheric conditions. With this in mind, one of the principal features of the present invention is the provision of novel means and method of removing said silicate surface film from the lens parts to be heat joined prior to their assembly and fusion. This removal of the silicate film is accomplished by dehydrating the surfaces of the major part 10 and disc 12 of a lens blank to be fused as follows:

The major part 10 of blank L having been cleaned and dusted by any conventional method, is positioned upon vacuum holder 18 of furnace 13 in the manner discussed above and holder 18 is rotated by shaft 19 so as to position the countersink 11 thereof in a downwardly facing direction substantially as shown in Fig. 3. By so facing the countersink 11, the possible accumulation of dust or other particulate matter upon countersink 11 is greatly reduced. Although it is preferable to maintain a substantially dust-free atmosphere in and around furnace 13 during its use, the added precaution of downwardly facing the countersink 11 has proven to be an extremely important feature of the present process since it tends to eliminate the possibility of foreign matter becoming entrapped between the subsequently fused parts of the blank L.

With the partition 16 of furnace 13 in the position shown in Fig. 3, the disc 12, to be fused to countersink 11, is positioned upon rack 24 with its surface 12a directed downwardly as illustrated. If desired, a plurality of discs 12 may be placed upon rack 24 and temperature conditioned for use in subsequent fusing operations. It will be noted that by positioning the disc 12 with its surface 12a facing downwardly, the said surface will tend to be maintained dust-free for the reasons discussed with regard to countersink 11 of part 10.

The doors 17 of furnace 13 are closed and chamber 14 is heated for a period of time sufficient to cause the countersink 11 of part 10 to become completely dehydrated, that is, to have the hydrated silicate film thereon completely removed and oxidized to remove what particulate matter that might be present. It has been found that satisfactory dehydration may be obtained by maintaining part 10, if formed of optical crown glass, for example, at a temperature of from 1200° Fahrenheit to 1250° Fahrenheit for a minimum time period of approximately one-half hour. In the meantime, chamber 15 is heated to a temperature sufficient to cause surface 12a of disc 12 to become likewise dehydrated. Since the disc 12 is usually formed of optical flint glass or the like which has a relatively low concentration of silica, it ordinarily adsorbs very little moisture when exposed to normal atmospheric conditions. Consequently, disc 12 accumulates much less silicate film than the crown glass and the time required for dehydration of said disc is much less than that required for part 10. It has been found that in the case of disc 12, if formed of optical flint glass for example, a temperature of from 800° Fahrenheit to 900° Fahrenheit will produce satisfactory results.

Since the dehydration time period for disc 12 is less than that of part 10, said disc is retained in chamber 12 at the above-mentioned temperatures during the complete dehydrating cycle of part 10.

Upon completing the dehydration and oxidization of part 10 and disc 12, the temperatures in chambers 14 and 15 are reduced in preparation for the assembly of disc 12 with part 10. A temperature of approximately 800° Fahrenheit has been found to produce satisfactory results and is maintained during the following steps of assembling disc 12 with part 10:

When the temperatures of disc 12 and part 10 have been stabilized, to approximately 800° Fahrenheit there will be no thermal shock encountered when the parts are assembled as, for example, by raising the partition 16 of furnace 13 to allow disc 12 to be passed from chamber 15 into chamber 14 for assembly with part 10. Doors 17 are opened, holder 18 is revolved 180° to cause countersink 11 to face upwardly as shown in Fig. 4, and disc 12 is transferred from rack 24, by means of the pick-up means 26, and placed upon countersink 11 in the manner previously described. It has been found that for best results, the time required for transferring disc 12 to countersink 11 should be kept to a minimum of approximately two seconds or less.

It is particularly pointed out at this time that another important feature of the present invention is the provision of a steeper curvature on surface 12a of disc 12 than that of countersink 11. This steeper curvature allows the disc 12 to initially contact the countersink 11 and seek its center of gravity thereon. By so doing, the air between disc 12 and countersink 11 will be radially forced outwardly of countersink 11 as disc 12 gradually slumps into said countersink during the following fusing cycle. This feature allows an accurate initial positioning of the disc upon the countersink while providing ample free space for said air to escape during the fusing operation without the use of glass wedges or other complicated means used heretofore in attempts to avoid the entrapment of air bubbles between the fused parts of the lens blanks. Furthermore, it is pointed out that no development of a concentration of air or gasous bubbles is encountered at the contact spot between disc 12 and countersink 11 since at the time of assembly, the temperature of said parts is maintained so low as to permit disc 12 to seek its center of gravity without wetting countersink 11. That is, fusion takes place only after assembly when the glass temperatures are again raised. The residual contact spots common to conventional fusing techniques is then obviously completely avoided.

After assembling disc 12 with countersink 11, the doors 17 of furnace 13 are closed, partition 16 replaced and the temperature in chamber 14 is raised for a time period sufficient to allow the surface 13a of disc 12 to assume the shape of countersink 11 and be positively fused thereto. Satisfactory results have been obtained with temperatures from 1200° Fahrenheit to 1350° Fahrenheit for a time period of ten minutes or less. Higher temperatures and/or extended periods of time will tend to result in distortions or other imperfections in the resultant fused parts.

Upon completion of the fusing cycle the lens blanks are annealed by lowering the temperature in furnace 13 to within the range of 1050° to 950° Fahrenheit for a time period of approximately one-half hour. The fused and annealed lens blank is then cooled to room temperature and subsequently finished in the conventional manner by abrading and optically polishing the segment side thereof to a predetermined finished surface such as diagrammatically illustrated by dash line F of Fig. 2. A second finished curvature $F^1$ is later provided on the concave side of blank L in accordance with the particular optical requirements of the user.

It is pointed out that although the disc 12 has been shown and described as a single piece of lens medium for purposes of forming a bifocal lens blank, said disc, when forming a lens blank having more than two focal fields, may comprise two or more assembled pieces of optical glass having different indices of refraction. In such cases, the above-described fusing operation would be conducted in substantially the same manner with the proper temperatures and time cycles of heating as given above by way of example only. For example, a disc for use in producing what is known as a trifocal lens may comprise three edge-fused pieces of glass having a single curved surface on one side thereof which is of a shorter radius of curvature than the countersink in the major piece of glass. In such an instance, the disc might comprise three pieces of glass edge-fused to each other, one comprising a piece of low melting barium crown glass having an index of refraction of about 1.66 shaped to produce the reading portion of the lens, another comprising an intermediate melting piece of barium crown glass having an index of refraction of about 1.61 and a third piece of higher melting crown glass having an index of refraction of about 1.523 and similar to the major piece of glass. In this instance, the composite disc is provided on the countersink engaging side thereof with a continuous curve steeper than the curve of the countersink. During fusion and using the same technique described above for the single disc and substantially the same temperatures and time cycles, the low-melting barium crown glass will melt and drop to the shape of and fuse to the countersink curve, the intermediate melting barium crown glass will next melt and assume the shape of and fuse to the countersink curve and the high-melting crown glass will next melt and assume the shape of and fuse to the countersink curve. In this manner, no air bubbles will be trapped between the fused surfaces.

It is to be understood that the invention should not be limited to the specific glasses set forth herein since all glasses whether containing silica or not as part of their chemical composition do adsorb moisture and/or other gases in amounts which may be detrimental to the interfacial quality of the multifocal lenses fabricated therefrom.

From the above, it can be seen that an improved, simplified and economical method has been provided for obtaining all the objects and advantages of the invention and that many changes in the details of construction, arrangement of parts and steps of the process may be made without departing from the spirit of the invention as set forth in the accompanying claim.

Having described my invention, I claim:

The method of forming a fused type multifocal lens blank comprising forming on one side of a major piece of low index optical glass a spherically curved countersink of a given radius of curvature, forming on one side of a disc of high index optical glass a spherically curved surface of a shorter radius of curvature than that of said countersink, cleansing said countersink and said curved surface of said disc to remove what foreign matter might be present thereon, supporting both of said pieces of glass with their spherically curved surfaces facing downwardly in an atmosphere which is substantially dust-free to avoid any possible accumulation of particulate matter on said surfaces, heating said pieces while so supported each to a predetermined temperature and for a time interval sufficient to dehydrate and oxidize the surfaces of the parts to be joined so as to substantially rid said surfaces of any existing hydrated silicate film which might be initially present on said spherically curved surfaces and to simultaneously cause oxidation of other matter which may be on said surfaces, reducing the temperature of at least one of said pieces to bring said pieces to temperatures which will prevent thermal shock when said pieces are subsequently assembled, inverting one of said pieces, immediately placing the other of said pieces on said inverted one of said pieces with said spherically curved surfaces in engaging aligned relation with each other, heating said pieces of the assembly to a temperature greater than said reduced temperature and of an amount sufficient to cause the spherically curved surface of said disc to assume the shape of said countersink and become integrally fused thereto throughout its area and while retaining the spherical curvature of the countersink and thereafter reducing the temperature of said pieces relatively slowly to room temperature and at a rate controlled to prevent fracturing of said glasses.

References Cited in the file of this patent

UNITED STATES PATENTS

| | | |
|---|---|---|
| 1,026,182 | Seymour | May 14, 1912 |
| 1,520,617 | Tillyer et al. | Dec. 23, 1924 |
| 1,617,955 | Kutchka | Feb. 15, 1927 |
| 1,734,428 | Haering | Nov. 5, 1929 |
| 1,960,121 | Moulton | May 22, 1934 |
| 2,026,606 | Bausch | Jan. 7, 1936 |
| 2,112,659 | Reh | Mar. 29, 1938 |
| 2,297,122 | Ziegler | Sept. 29, 1942 |
| 2,407,878 | Greetham | Sept. 17, 1946 |
| 2,640,299 | Sheard et al. | June 2, 1953 |
| 2,790,886 | Fry | Apr. 30, 1957 |